United States Patent
Smit

(10) Patent No.: US 11,064,824 B1
(45) Date of Patent: Jul. 20, 2021

(54) AUTOMATED PLANT SLEEVE PRODUCTION ASSEMBLY

(71) Applicant: Intech Engineering, Inc., Miami, FL (US)

(72) Inventor: John Smit, Miami, FL (US)

(73) Assignee: INTECH Engineering, INC., Miami, FL (US)

( * ) Notice: Subject to any disclaimer, the term of this patent is extended or adjusted under 35 U.S.C. 154(b) by 171 days.

(21) Appl. No.: 16/449,653

(22) Filed: Jun. 24, 2019

Related U.S. Application Data

(60) Provisional application No. 62/689,621, filed on Jun. 25, 2018.

(51) Int. Cl.
| | |
|---|---|
| *A01G 5/02* | (2006.01) |
| *B65B 25/02* | (2006.01) |
| *B65B 43/10* | (2006.01) |
| *B65D 85/52* | (2006.01) |
| *A47G 7/08* | (2006.01) |
| *B65B 51/06* | (2006.01) |

(52) U.S. Cl.
CPC ............... *A47G 7/085* (2013.01); *A01G 5/02* (2013.01); *B65B 25/02* (2013.01); *B65B 43/10* (2013.01); *B65B 51/067* (2013.01); *B65D 85/52* (2013.01)

(58) Field of Classification Search
CPC ........ A47G 7/085; B65B 25/02; B65B 43/10; A01G 5/02
USPC ........................................................ 493/243
See application file for complete search history.

(56) References Cited

U.S. PATENT DOCUMENTS

| | | | |
|---|---|---|---|
| 2,005,326 A | 6/1935 | Schindler | |
| 2,511,417 A | 6/1950 | Schindler | |
| 3,503,098 A | 3/1970 | Shore | |
| 4,118,890 A | 10/1978 | Shore | |
| 4,980,209 A | 12/1990 | Hill | |
| 5,493,809 A * | 2/1996 | Weder | A01G 5/04 206/423 |
| 5,945,195 A | 8/1999 | McDonald | |
| 6,007,895 A | 12/1999 | McDonald | |
| 6,056,323 A | 5/2000 | McDonald | |
| 6,786,003 B2 * | 9/2004 | Gilbert | B65D 85/505 47/41.01 |
| 7,021,000 B2 | 4/2006 | Weder | |
| 7,251,913 B2 | 8/2007 | Weder | |
| 7,353,583 B1 | 4/2008 | Clarke | |
| 7,396,320 B2 | 7/2008 | Tchira | |
| 8,058,192 B2 * | 11/2011 | Helms | B29C 66/8322 442/381 |
| 8,104,225 B2 | 1/2012 | Weder | |

* cited by examiner

*Primary Examiner* — Robert F Long
*Assistant Examiner* — Xavier A Madison
(74) *Attorney, Agent, or Firm* — Malloy & Malloy P.L; Jennie S. Malloy

(57) ABSTRACT

An assembly for the automated production of conical paper sleeves for plants uses paper stock precut in a trapezoid configuration which is continuously fed to the assembly. The precut sheets are folded diagonally twice to form a conical sleeve. The folding process includes application of an adhesive on the overlap of the folded sides to securely seal the sleeve. The precut sheets are transported along the assembly via a series of belts, rollers and electrical motors. The synchronization of the folding process and the application of adhesive is electronically monitored and controlled.

13 Claims, 1 Drawing Sheet

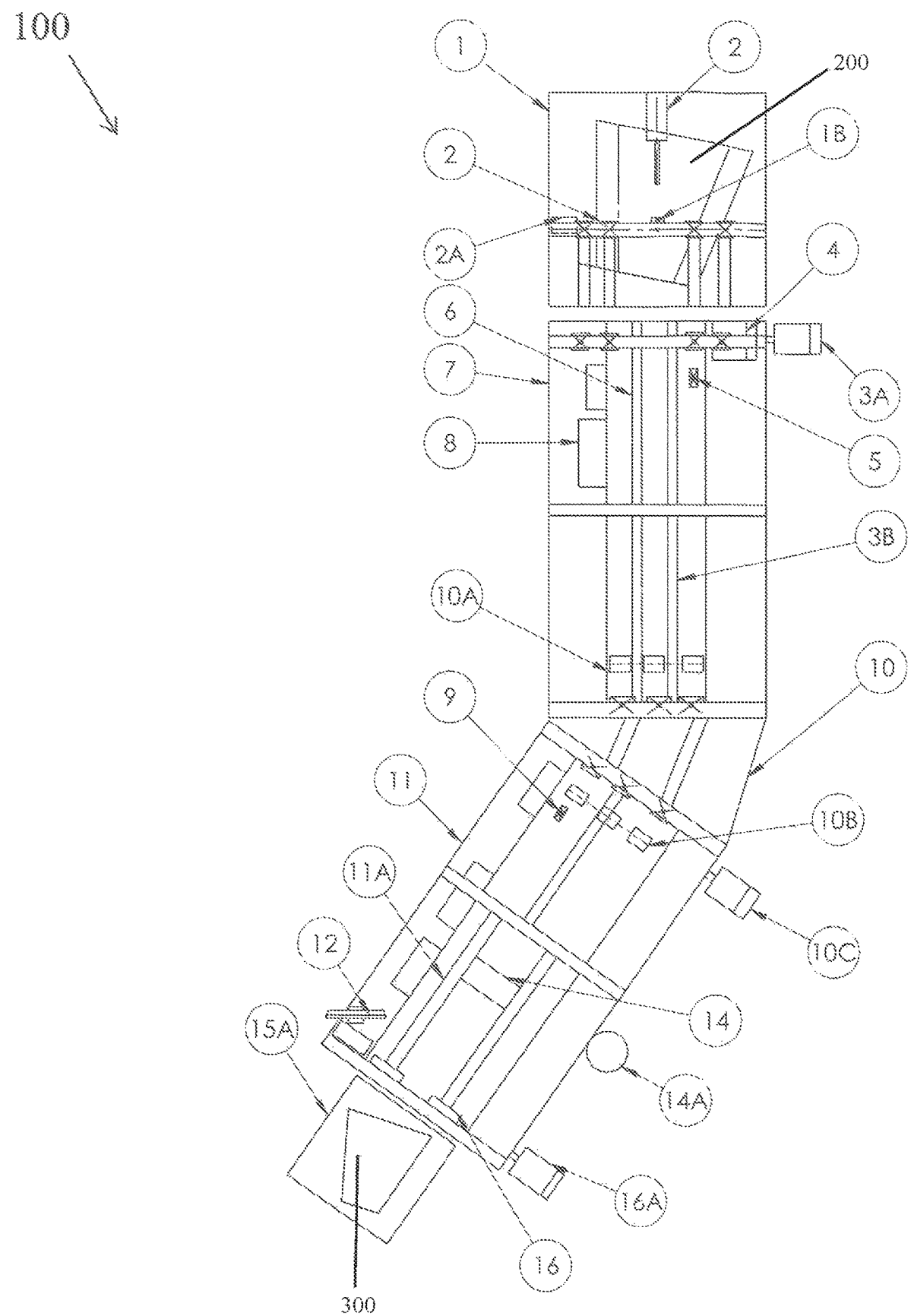

AUTOMATED PLANT SLEEVE PRODUCTION ASSEMBLY

BACKGROUND OF THE INVENTION

Field of the Invention

The present invention relates to producing paper sleeves from paper stock, in particular, by using a fully automated machine to take precut and pre-sized Kraft paper stock and creating conical paper sleeves. The conical paper sleeves are commonly used as a protective outer cover for transporting plants.

Description of the Related Art

The production of paper sleeves for use as an outer protective cover for plants generally involves the fusion of two sheets of Kraft paper stock that are bound together by use of an adhesive, creating the sleeve itself. A secondary method includes the use of a single sheet of Kraft paper stock which is precut to a trapezoid shape and folded diagonally to create the frustum of a cone, and an adhesive is applied to the overlap to create the final sleeve. The invention disclosed herein focuses on the use of a single precut sheet of Kraft paper stock that is formed into a conical paper sleeve via an automatic assembly from start to finish.

SUMMARY OF THE INVENTION

The present invention is designed to create conical paper plant sleeves of a specific size via a fully automated assembly. The focus of this invention is to increase the productivity in the manufacture of conical paper sleeves and to insure a higher output during a predetermined timeframe, while assuring the output itself meets specified standards and requirements. The conical sleeves produced by the present assembly are uniform in size and specification. The present invention utilizes a series of feeding rollers, folding guides and sensors that are monitored and actuated via a programmable controller that operates the motors and other electronics to assure a smooth transaction from start to completion. The invention eliminates the need for manual interaction in the production of conical paper sleeves.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a top plan view of one illustrative embodiment of an automated plant sleeve production assembly in accordance with the present invention.

Like reference numerals refer to like parts throughout the several views of the drawings.

DETAILED DESCRIPTION OF THE PREFERRED EMBODIMENT

FIG. 1 is illustrative of one illustrative embodiment of an automated plant sleeve production assembly 100 in accordance with the present invention. The assembly 100 originates at a lift table 1 and terminates at a receiving basket 15A.

The present assembly 100 is utilized to automate the process of producing plant paper sleeves, such as, by way of example, from Kraft paper stock, thereby increasing productivity while insuring the sleeves produced meet standard criteria. For purposes of illustrating the assembly 100, as an initial matter, the paper stock is precut into a trapezoidal shape. FIG. 1 is illustrative of one embodiment of the components of the present assembly 100.

Once paper stock is precut into a trapezoidal shape, the precut sheet of paper stock 200 is placed on a lift table 1 in a stack. The lift table 1 may comprise a scissor-type mechanism, activated by either an electrical or hydraulic system. An actuator (not shown) is controlled by a level switch 1B to maintain the proper height and insure an uninterrupted supply of precut sheets as the stock is consumed. The trapezoidal precut sheets 200 are placed on the lift table 1, and, in at least one embodiment, the lift table 1 is placed at an angle proportional to the taper of a first fold of the precut sheet, and the precut sheets are fed into the process by soft rubber feeding rollers 2. The feeding rollers 2, driven by an electrical motor 2A, take the top precut sheet of paper stock 200 from the lift table 1 and transfer it onto a first table 7.

As each precut sheet 200 is transferred to the first table 7, a sensor 5 is triggered, activating incoming rollers 4 while releasing the feeding rollers 2 from the surface of the stack. The first table 7 has a rectangular configuration with belts driven by an electrical motor 3A. The belts assist the precut sheet 200 in traveling along the first table 7 for the folding process.

While the precut sheet 200 travels along the first table 7, there are one or more folding guides 6 that form a first 180 degree angle fold. The top roller belts and metal bands 3B maintain the precut sheet 200 in contact with bottom belts. The precut sheet 200 then travels to the end of the first table 7, and in at least one embodiment, engages a transfer section 10. The precut sheet 200 is assisted by a series of rollers 10A, 10B.

The transfer section 10 utilizes the lifting rollers 10A on the first table 7 and the lifting rollers 10B on a second table 11. The second table 11 includes a motor 10C and connects to the first table 7 at an angle proportional to the taper of the frustum cone shape of the second fold of the final product. As the precut sheet, already folded on one side, exits the first table 7, it is assisted by the rollers 10A and will reach a sensor 9 on the second table 11. At this point, the lifting rollers 10B on the second table 11 will engage the precut sheet, while the rollers 10A on the first table 7 simultaneously release the precut sheet, creating a smooth and controlled transfer.

As the half folded precut sheet travels along the second table 11, folding guides 11A will assist in making a second 180 degree fold to complete the final shape of the sleeve. While the second fold is in process, an adhesive is applied to the first fold overlap. The adhesive, in one embodiment, is applied from an air pressurized adhesive tank 14A by way of the electro-pneumatic adhesive applicator 14. The adhesive applicator 14 is displaced in a manner that coincides with a line of symmetry of each precut sheet. In accordance with at least one embodiment, the adhesive applicator 14 moves transversely to the second table 11 in a controlled manner while applying an amount of adhesive.

The newly created paper sleeve reaches the end of the second table 11, passing a set of creasing rollers 16 that operate off a motor 16A. The force of the creasing rollers 16 flatten the final product, and the final product is ejected by the creasing rollers 16 into the receiving basket 15A, where it is later removed.

The operation of the present assembly 100 is monitored via data acquisition unit 12. A programmable controller 8 comprises algorithms to precisely control the timing of the application of adhesive with the transport of each precut sheet 200 through the adhesive applicator 14, thereby applying a precise amount of adhesive to each precut sheet 200 as it passes through the adhesive applicator 14. The application of adhesive is immediately followed by the precut sheet 200 traveling through folding guides 11A on the second table, and then through the creasing rollers 16, to create the final conical paper plant sleeve 300.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An automated plant sleeve production assembly for forming a conical paper plant sleeve from a precut sheet of paper stock, said assembly comprising:
    a lifting table on which a plurality of precut sheets of paper stock are initially staged, said lifting table positioned at an angle proportional to a taper of a first fold of the precut sheets,
    at least one feeding roller transfers each precut sheet from said lifting table onto a first table,
    a sensor activates said at least one feeding roller,
    at least one belt on said first table transports each precut sheet along said first table,
    a folding guide on said first table forms a first 180 degree angle fold in each precut sheet,
    at least one lifting roller transfers each first folded precut sheet from said first table to a transfer section interconnecting said first table to a second table,
    said second table connected to said transfer section at an angle which is proportional to a taper of a second fold of the precut sheets,
    an adhesive applicator disposed on said second table, said adhesive applicator applies an amount of adhesive onto a surface of each first folded precut sheet such that said adhesive is applied coincident with a line of symmetry of each first folded precut sheet,
    a folding guide on said second table forms a second 180 degree angle fold in each first folded precut sheet, thereby forming a conical configuration of the conical paper plant sleeves, wherein the sleeves are transported through at least one creasing roller where pressure is applied to bond said amount of adhesive, thereby forming the conical paper plant sleeve from the precut sheets of paper stock, and
    a receiving basket into which the conical paper plant sleeves are deposited.

2. The assembly as recited in claim 1 wherein said lifting table comprises a scissor lift design.

3. The assembly as recited in claim 1 further comprising a plurality of feeding rollers to transfer each precut sheet from said lifting table onto a first table.

4. The assembly as recited in claim 3 further comprising a motor to operate said plurality of feeding rollers.

5. The assembly as recited in claim 1 further comprising a plurality of lifting rollers on said first table to transport each first folded precut sheet from said first table to said transfer section.

6. The assembly as recited in claim 1 further comprising at least one lifting roller on said second table to receive each first folded precut sheet from said transfer section.

7. The assembly as recited in claim 1 further comprising a plurality of lifting rollers on said second table to receive each first folded precut sheet from said transfer section.

8. The assembly as recited in claim 1 wherein a sensor activates said at least one lifting roller on said first table to transfer each precut sheet from said first table to said transfer section.

9. The assembly as recited in claim 1 further comprising a pressurized adhesive tank operatively connected to said adhesive applicator.

10. The assembly as recited in claim 1 wherein said adhesive applicator is actuated via a programmable controller.

11. The assembly as recited in claim 1 wherein said adhesive applicator is disposed in a stationary position while applying said amount of adhesive onto each precut sheet.

12. The assembly as recited in claim 1 wherein said adhesive applicator moves transversely relative to said second table while applying said amount of adhesive.

13. An automated plant sleeve production assembly for forming a conical paper plant sleeve from a precut sheet of paper stock, said assembly comprising:
    a lifting table on which a plurality of precut sheets of paper stock are initially staged, said lifting table positioned at an angle proportional to a taper of a first fold of the precut sheets,
    at least one feeding roller transfers each precut sheet from said lifting table onto a first table,
    a sensor activates said at least one feeding roller,
    at least one belt on said first table transports each precut sheet along said first table,
    a folding guide on said first table forms a first 180 degree angle fold in each precut sheet,
    at least one lifting roller transports each first folded precut sheet from said first table to a second table,
    an adhesive applicator disposed on said second table, said adhesive applicator applies an amount of adhesive onto a surface of each first folded precut sheet, such that said adhesive is applied coincident with a line of symmetry of each first folded precut sheet,
    a folding guide on said second table forms a second 180 degree angle fold in each first folded precut sheet, thereby forming a conical configuration of the conical paper plant sleeves, wherein the sleeves are transported through at least one creasing roller where pressure is applied to bond said amount of adhesive, thereby forming the conical paper plant sleeve from the precut sheets of paper stock, and
    a receiving basket into which the conical paper plant sleeves are deposited.

* * * * *